United States Patent
Katsuki

(10) Patent No.: US 12,103,527 B2
(45) Date of Patent: Oct. 1, 2024

(54) WEIGHT ESTIMATION SYSTEM

(71) Applicant: IHI CORPORATION, Tokyo (JP)

(72) Inventor: Yoshio Katsuki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 355 days.

(21) Appl. No.: 17/600,181

(22) PCT Filed: Mar. 17, 2020

(86) PCT No.: PCT/JP2020/011680
§ 371 (c)(1),
(2) Date: Sep. 30, 2021

(87) PCT Pub. No.: WO2020/203253
PCT Pub. Date: Oct. 8, 2020

(65) Prior Publication Data
US 2022/0176959 A1 Jun. 9, 2022

(30) Foreign Application Priority Data

Apr. 3, 2019 (JP) ................. 2019-071473

(51) Int. Cl.
*G01G 9/00* (2006.01)
*B60W 30/14* (2006.01)
(Continued)

(52) U.S. Cl.
CPC ............. *B60W 30/146* (2013.01); *G01G 9/00* (2013.01); *G01G 19/08* (2013.01); *G01M 1/122* (2013.01); *B60W 2530/10* (2013.01)

(58) Field of Classification Search
CPC ........... B60W 30/146; B60W 2530/10; B60W 2422/00; B60W 2422/95; B60W 2040/1315; B60W 2300/12; B60W 2420/52; B60W 2556/10; B60W 2720/10; B60W 2720/106; B60W 40/13; G01G 9/00; G01G 19/08; G01G 19/12; G01G 19/64; G01G 23/32; G01M 1/122; B60K 31/00
See application file for complete search history.

(56) References Cited

U.S. PATENT DOCUMENTS

2005/0087389 A1* 4/2005 Turner .................. B60W 30/04
180/446
2010/0145576 A1* 6/2010 Doi ........................ B62D 61/00
701/41
(Continued)

FOREIGN PATENT DOCUMENTS

CN 103625476 A 3/2014
CN 104568096 A 4/2015
(Continued)

*Primary Examiner* — Abby Y Lin
*Assistant Examiner* — Danielle M Jackson

(57) ABSTRACT

Provided is a weight estimation system (S) including: a change amount calculation device (2) which acquires a height of a loading platform (N) before loading a vehicle and a height of the loading platform (N) after loading the vehicle and calculates an amount of change between the heights of the loading platform (N) between before and after the loading; and a loaded weight estimation device (4) which estimates a loaded weight on the basis of a correlation between the amount of change and a loaded weight stored in advance.

1 Claim, 3 Drawing Sheets

(51) Int. Cl.
   *G01G 19/08*    (2006.01)
   *G01M 1/12*     (2006.01)

(56) References Cited

U.S. PATENT DOCUMENTS

| | | | |
|---|---|---|---|
| 2011/0248861 A1* | 10/2011 | Corrado | G01G 19/08 33/701 |
| 2015/0323376 A1 | 11/2015 | Cullen et al. | |
| 2015/0367857 A1 | 12/2015 | Kozuka et al. | |
| 2019/0023098 A1 | 1/2019 | Iwaki et al. | |
| 2022/0041172 A1* | 2/2022 | Jundt | B60W 40/10 |

FOREIGN PATENT DOCUMENTS

| | | | |
|---|---|---|---|
| CN | 104955689 A | | 9/2015 |
| CN | 106679782 A | | 5/2017 |
| CN | 107122943 A | | 9/2017 |
| DE | 102012214827 A1 | | 2/2014 |
| DE | 102014001031 A1 | | 7/2015 |
| GB | 2450377 | | 12/2008 |
| JP | S61-080015 A | | 4/1986 |
| JP | S63-063924 A | | 3/1988 |
| JP | H06-323894 A | | 11/1994 |
| JP | H08-210905 A | | 8/1996 |
| JP | H10-054751 A | | 2/1998 |
| JP | H11-304576 A | | 11/1999 |
| JP | 2001-242003 A | | 9/2001 |
| JP | 2010-092115 A | | 4/2010 |
| JP | 2013-125350 A | | 6/2013 |
| JP | 5894781 B2 | | 3/2016 |
| JP | 2018017637 A | * | 2/2018 |
| JP | 2019-007452 A | | 1/2019 |
| WO | 2009/001039 A1 | | 12/2008 |
| WO | 2011/030412 A1 | | 3/2011 |

\* cited by examiner

WEIGHT ESTIMATION SYSTEM

CROSS REFERENCE TO RELATED APPLICATIONS

This patent application is a U.S. national-stage application under 35 U.S.C. § 371 of International Patent Application No. PCT/JP2020/011680 filed on Mar. 17, 2020, which claims the benefit of foreign priority to Japanese Patent Application No. JP 2019-071473 filed on Apr. 3, 2019. The International Application was published in Japanese on Oct. 8, 2020, as International Publication No. WO 2020/203253 A1 under PCT Article 21(2).

TECHNICAL FIELD

The present disclosure relates to a weight estimation system. Priority is claimed on Japanese Patent Application No. 2019-071473, filed in Japan on Apr. 3, 2019, the content of which is incorporated herein by reference.

BACKGROUND ART

For example, Patent Document 1 discloses an automatic guided vehicle. Such an automatic guided vehicle of Patent Document 1 is used for loading and unloading a container for a container ship and autonomously travels on a traveling route on the basis of a command of program control that performs driving control. Also, in the automatic guided vehicle of Patent Document 1, a weight of a container loaded on a vehicle is estimated on the basis of a torque of an electric motor at the time of traveling.

CITATION LIST

Patent Document

[Patent Document 1]
  Japanese Unexamined Patent Application, First Publication No. 2013-125350

SUMMARY OF INVENTION

Technical Problem

Incidentally, at present, autonomous traveling using a large transport vehicle such as a truck has been studied. In such an autonomous vehicle, since a driver does not board the vehicle, it is difficult to recognize a weight of a container (i.e., load). Also, most large transport vehicles are not electric, and thus the weight estimation technology described in Patent Document 1 cannot be used.

The present disclosure has been made in view of the above-described problems, and an objective of the present disclosure is to estimate a weight of a load in a transport vehicle.

Solution to Problem

To achieve the above-described objective, a first aspect according to a weight estimation system of the present disclosure employs a weight estimation system including: a change amount calculation device which acquires a height of a loading platform before loading a vehicle and a height of the loading platform after loading the vehicle and calculates an amount of change between the heights of the loading platform between before and after the loading, and a loaded weight estimation device which estimates a loaded weight on the basis of a correlation between the amount of change and a loaded weight stored in advance.

As a second aspect according to the weight estimation system, the above-described first aspect may include a measuring device mounted on the vehicle and which measures a height of the loading platform of the vehicle.

As a third aspect according to the weight estimation system, in the above-described second aspect, the measuring device may be one of a plurality of measuring devices, the plurality of measuring devices may be provided in the vehicle, and a center of gravity position estimation device which estimates a center of gravity position on the basis of differences between the heights of the loading platform after the loading, the heights being obtained from the plurality of measuring devices, may be provided.

As a fourth aspect according to the weight estimation system, the above-described third aspect may include a speed limit setting device which sets a speed limit of the vehicle on the basis of the center of gravity position.

Effects of Invention

According to the present disclosure, a weight of a load in a transport vehicle can be estimated by the loaded weight estimation device.

DESCRIPTION OF EMBODIMENTS

Hereinafter, a posture detection device according to one embodiment of the present disclosure will be described with reference to the drawings.

A driving control system S (i.e., weight estimation system) according to one embodiment of the present disclosure is a system for transporting an object to be transported (for example, a container C) to a desired location or assisting the transport thereof. The driving control system S of the present disclosure is a system for performing autonomous traveling of a transport vehicle transporting an object to be transported.

Figure 1:
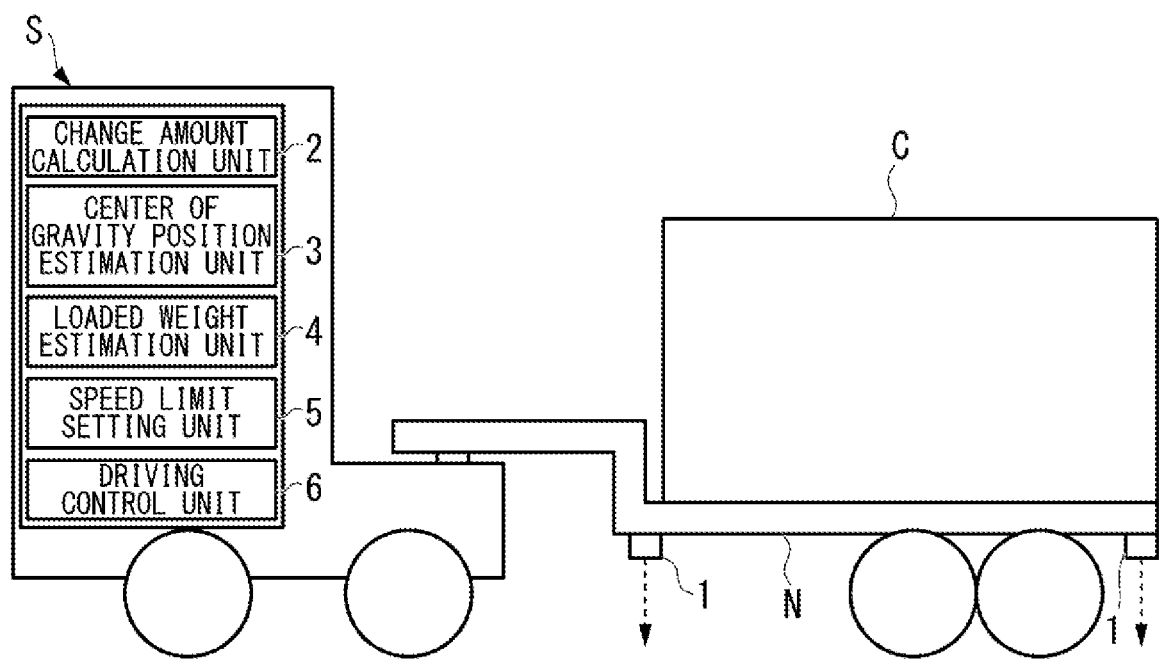
FIG. 1 is a schematic view including a weight estimation system according to one embodiment of the present disclosure.

As shown in FIG. 1, the driving control system S according to the present embodiment includes a plurality of distance sensors 1 (i.e., measuring device), a change amount calculation unit 2 (i.e., change amount calculation device), a center of gravity position estimation unit 3 (i.e., center of gravity position estimation device), a loaded weight estimation unit 4 (i.e., loaded weight estimation device), a speed limit setting unit 5 (i.e., speed limit setting device), and a driving control unit 6. Further, the change amount calculation unit 2, the center of gravity position estimation unit 3, the loaded weight estimation unit 4, the speed limit setting unit 5, and the driving control unit 6 are configured as one function of a computing device. Also, the computing device described above is a computer configured by a central processing unit (CPU), a memory, and the like. The computing device described above may be, for example, an ECU mounted on a transport vehicle. Further, the change amount calculation unit 2 (i.e., change amount calculation device), the center of gravity position estimation unit 3 (i.e., center of gravity position estimation device), the loaded weight estimation unit 4 (i.e., loaded weight estimation device), the speed limit setting unit 5 (i.e., speed limit setting device), and the driving control unit 6 may each be a computer configured by a central processing unit (i.e., CPU), a memory, and the like.

Figure 2:
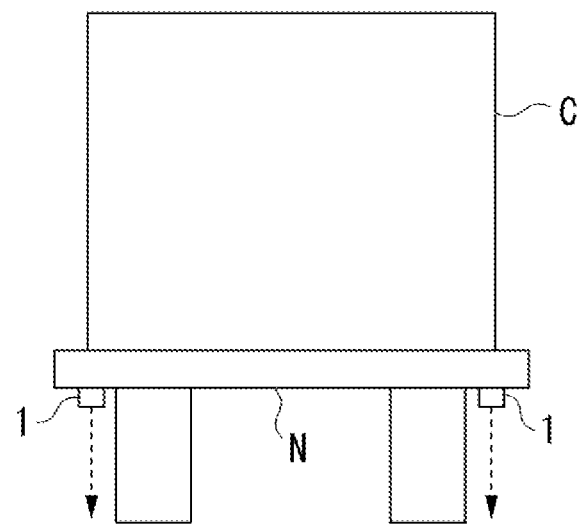
FIG. 2 is a schematic view showing an attachment position of a distance sensor in a transport vehicle.

For example, for a lower part of a transport vehicle (i.e., vehicle), two distance sensors 1 are provided to face in a front-rear direction in a traveling direction as shown in FIG. 1, and furthermore, two distance sensors 1 are provided on a chassis disposed in a direction (i.e., left-right direction) perpendicular to the traveling direction to be separated by a predetermined distance as shown in FIG. 2. That is, the distance sensors 1 are attached to four measurement points in total at the left, right, front, and rear of the lower part of the vehicle. Such a distance sensor 1 is a device that measures a distance of a loading platform N from the ground (i.e., height of the loading platform N) by scanning with a laser beam downward in a vertical direction. Further, the distance sensor 1 attached on the front side in the traveling direction can scan a region including a front and rear of the transport vehicle and can also detect an obstacle. The distance sensor 1 may be, for example, a two-dimensional or three-dimensional laser range finder (i.e., LRF) or a two-dimensional or three-dimensional laser imaging detection and ranging (i.e., LIDAR, Light Detection and Ranging). Also, the distance sensor 1 may be one to which data of a sensor used for simultaneous localization and mapping (i.e., SLAM) is applied.

The change amount calculation unit 2 acquires a distance from the chassis of the transport vehicle to the ground from the distance sensor 1. Then, the change amount calculation unit 2 calculates a difference (i.e., amount of change) between distances in each distance sensor 1, the distances being from the chassis of the transport vehicle to the ground before and after loading.

The center of gravity position estimation unit 3 acquires the differences between the distances, the differences being calculated by the change amount calculation unit 2, and the distances being to the ground in the four distance sensors 1. Then, the center of gravity position estimation unit 3 estimates a center of gravity position of the transport vehicle on the basis of the differences between the distances, the distances being to the ground acquired from the four distance sensors 1. A magnitude of the difference is correlated with a magnitude of the load at the measurement point. Therefore, the center of gravity position estimation unit 3 can estimate a center of gravity position from the differences between the distances, the distances being from the ground for the measurement points in the front-rear direction and the left-right direction, by calculating a mapping of a correlation between differences between distances from the ground and a center of gravity position in advance.

The loaded weight estimation unit 4 acquires the differences between the distances, the differences being calculated by the change amount calculation unit 2, and the distances being to the ground in the four distance sensors 1, and calculates, for example, an average value. Then, the loaded weight estimation unit 4 estimates a loaded weight on the basis of mapping data of the correlation between the loaded weight and the difference between the distances to the ground stored in advance. Further, the mapping data of the correlation between the loaded weight and the difference between the distances to the ground has a trend in which the loaded weight becomes larger as the difference between the distances to the ground becomes larger.

The speed limit setting unit 5 stores in advance a mapping of a correlation of the center of gravity position, the loaded weight, and a speed limit that does not cause a load collapse or a rollover. Then, the speed limit setting unit 5 acquires the center of gravity position and the loaded weight from the center of gravity position estimation unit 3 and the loaded weight estimation unit 4, and sets a speed limit of the transport vehicle on the basis of the above-described mapping of the correlation of the center of gravity position, the loaded weight, and the speed limit that does not cause a load collapse or a rollover. Further, the mapping of the correlation tends to set the speed limit to be lower, for example, when the center of gravity position of the transport vehicle is biased to one location of the transport vehicle or when the loaded weight is heavy.

The driving control unit 6 is a device that autonomously drives the transport vehicle on the basis of the estimated center of gravity position, the estimated loaded weight, and the speed limit. Further, the driving control unit 6 can autonomously drive the transport vehicle by storing driving routes in advance and using an obstacle detection system such as a camera or LIDAR.

Figure 3:
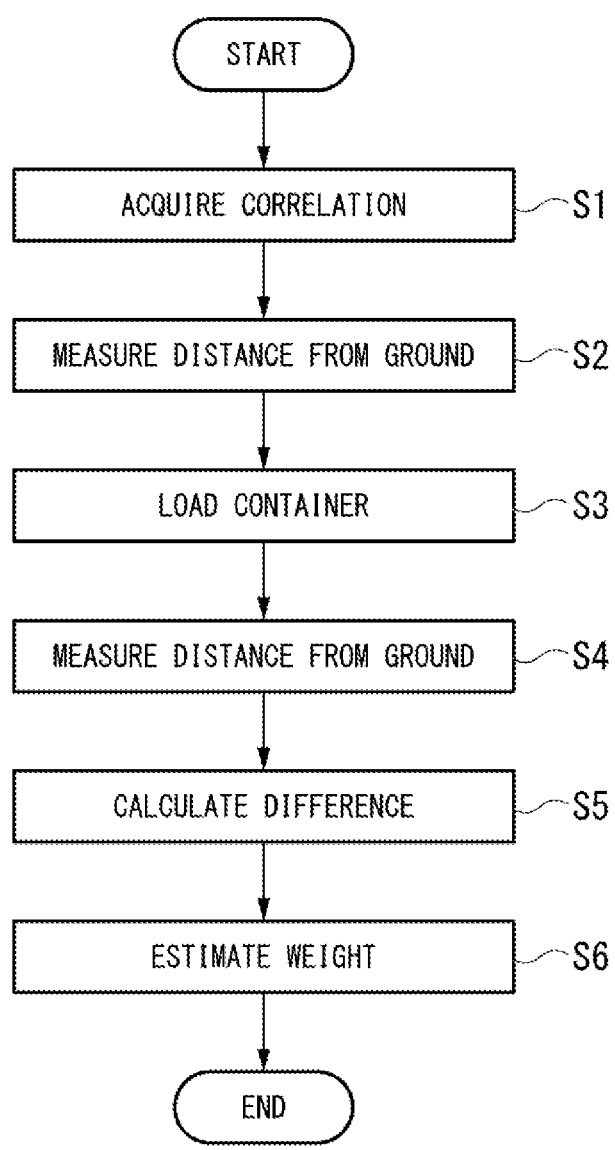
FIG. 3 is a flowchart for explaining a weight estimation procedure of the weight estimation system according to one embodiment of the present disclosure.

A flow of the weight estimation in such a driving control system S will be described with reference to FIG. 3.

First, the driving control system S acquires in advance a correlation between a difference between distances of the transport vehicle from the ground before and after loading and a loaded weight by measuring them beforehand (step S1).

In estimating a loaded weight in an actual transport vehicle, the driving control system S first measures a distance from the ground before loading using the distance sensor 1 (step S2), and then loads the container C on the transport vehicle (step S3).

Then, the driving control system S measures a distance from the ground after loading using the distance sensor 1 (step S4). Next, the driving control system S uses the change amount calculation unit 2 to calculate a difference between the distances, the distances being from the ground and being measured by the distance sensor 1 before and after the loading (step S5). Also, in step S5 of the present embodiment, an average of the differences in the four distance sensors 1 is further calculated.

The driving control system S uses the loaded weight estimation unit 4 to estimate a loaded weight by comparing the above-described average of the differences with the correlation acquired in advance in step S1 (step S6).

Figure 4:
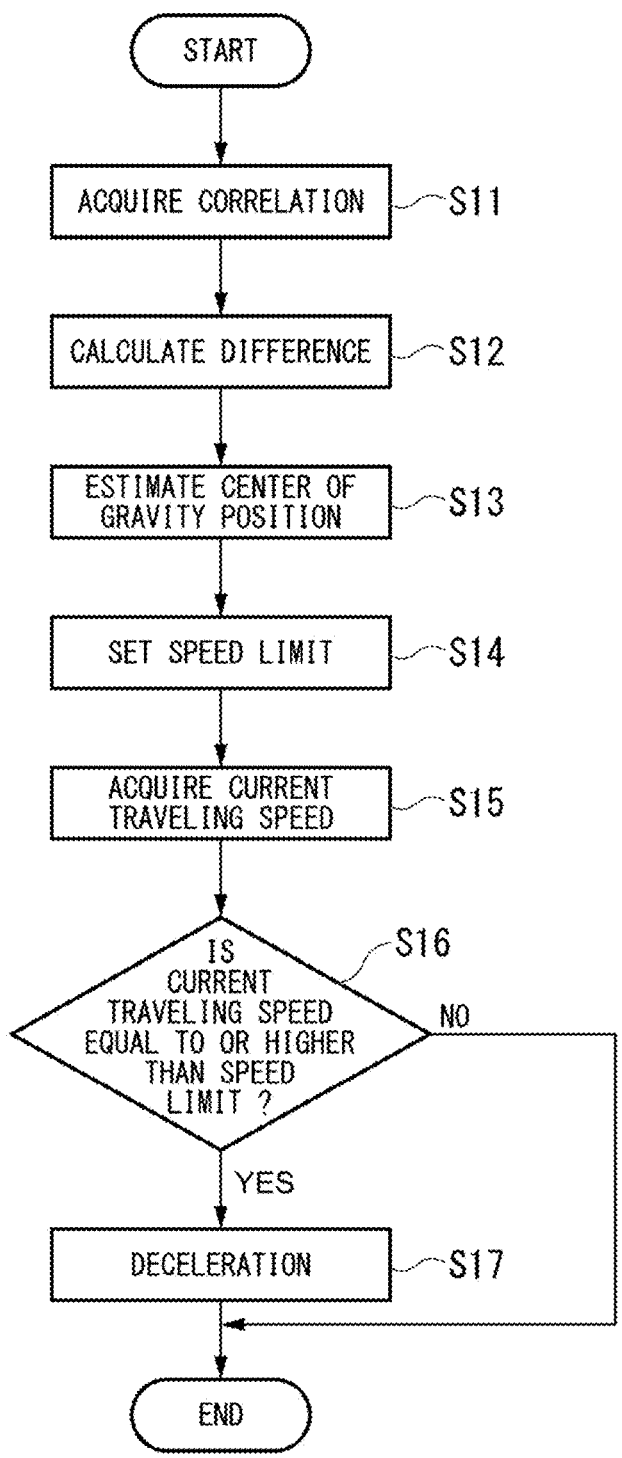
FIG. 4 is a flowchart for explaining a center of gravity and driving control procedure of the weight estimation system according to one embodiment of the present disclosure.

Next, a flow of estimating the center of gravity position and setting the speed limit in the driving control system S will be described with reference to FIG. 4.

The driving control system S uses the center of gravity position estimation unit 3 to acquire in advance a correlation between the differences between the distances from the ground of the transport vehicle and the center of gravity position by measuring them beforehand (step S11).

Then, the driving control system S calculates the differences between distances from the ground before and after the loading, the distances being acquired in steps S2 to S4 at the time of the weight estimation described above (step S12). Further, the driving control system S compares the above-described differences with the correlation acquired in advance in step S11 to estimate a center of gravity position (step S13).

Further, the driving control system S uses the speed limit setting unit 5 to acquire the loaded weight and set a speed limit from the center of gravity position and the loaded weight on the basis of the mapping of the correlation of the center of gravity position, the loaded weight, and the speed limit that does not cause a load collapse or a rollover stored in advance (step S14). Then, the driving control system S uses the driving control unit 6 to acquire a current traveling speed of the transport vehicle when the transport vehicle is traveling (step S15). Then, the driving control system S uses the driving control unit 6 to determine whether or not the current speed is equal to or higher than the speed limit set by the speed limit setting unit 5 (step S16). When the current speed is equal to or higher than the speed limit, that is, when the determination is YES, the driving control system S performs deceleration of the transport vehicle using the driving control unit 6 (step S17). Further, when the speed is less than the speed limit, that is, when the determination is NO, deceleration is not performed and the speed is maintained.

According to such a driving control system S of the present embodiment, a weight can be estimated using the distance sensor 1. Therefore, a loaded weight of a transport vehicle can be estimated with a simple configuration.

Further, according to the driving control system S of the present embodiment, a center of gravity position can be estimated by providing the plurality of distance sensors 1 in the transport vehicle. Therefore, a load collapse of the containers C loaded on the transport vehicle or a rollover can be prevented by driving based on the center of gravity position.

Also, according to the driving control system S of the present embodiment, the speed limit is set on the basis of the estimated center of gravity position and the estimated loaded weight. Thereby, autonomous driving of a transport vehicle can be performed on the basis of the center of gravity position and the loaded weight, and a load collapse of the containers C or a rollover of the transport vehicle can be prevented.

Further, the present disclosure is not limited to the above-described embodiment, and for example, the following modified examples can be conceived.
(1) In the above-described embodiment, the driving control system S is a system that assists autonomous driving of a transport vehicle, but the present disclosure is not limited thereto. For example, the driving control system S may be a system that provides driving assistance information to a driver of the transport vehicle. In this case, the speed limit, the weight, and the center of gravity position are displayed on a monitor or a windshield such that they can be visually recognized by the driver of the transport vehicle. Also, at the time of driving by a driver, the driving control unit 6 may also be configured to perform a deceleration only when the speed exceeds a speed limit set by the speed limit setting unit 5.
(2) Also, in the above-described embodiment, the speed limit during general driving is set by the speed limit setting unit 5, but the present disclosure is not limited thereto. For example, the speed limit setting unit 5 may also be configured to set a speed limit when turning around a curve in which a rollover is likely to occur.
(3) Also, in the above-described embodiment, the speed limit is set by the speed limit setting unit 5, but the present disclosure is not limited thereto. For example, the driving control system S can also set an upper limit of an acceleration during traveling. In this case, by providing an accelerometer for the transport vehicle, the driving control unit 6 can perform control to reduce the acceleration in a case in which an acceleration during traveling exceeds the upper limit.
(4) Also, in the above-described embodiment, the driving control system S includes the distance sensor 1, but the present disclosure is not limited thereto. For example, the driving control system S may also be configured to measure a height of a loading platform by using LIDAR for obstacle detection.
(5) Also, a marker can be provided around the transport vehicle, a distance between the marker and the distance sensor 1 can be measured, and thereby a loaded weight can also be measured from a difference between distances between the marker and the distance sensor 1 before and after loading. In this case, this can be applied even when the transport vehicle is parked on ground that is not flat.
(6) Also, a height of the loading platform N of the transport vehicle before and after loading can be measured by using a distance sensor (i.e., obstacle detection sensor) provided in a crane or forklift installed in a factory or the like, and the height of the loading platform N of the transport vehicle before and after loading can be transmitted to the transport vehicle by wireless communication or the like. In this case, a distance sensor or the like does not need to be provided in the vehicle.
(7) Also, in the above-described embodiment, the plurality of distance sensors 1 are provided, but the present disclosure is not limited thereto. Only one distance sensor 1 may be provided in the transport vehicle.
(8) Also, a change between heights of the loading platform N between before and after loading can be measured using an obstacle sensor provided on a head of the transport vehicle (i.e., a front of the vehicle). In this case, it is not necessary to additionally provide the distance sensor 1.
(9) Also, in the above-described embodiment, the differences between the distances to the ground in the four distance sensors 1 are acquired and averaged, but the present disclosure is not limited thereto. For example, a weighted average value may also be calculated from mapping data of the differences between the distances to the ground in the distance sensors 1, the loaded weight in total, and the center of gravity position.

INDUSTRIAL APPLICABILITY

According to the present disclosure, a weight of a load in a transport vehicle can be estimated by the loaded weight estimation device.

REFERENCE SIGNS LIST

1 Distance sensor
2 Change amount calculation unit
3 Center of gravity position estimation unit
4 Loaded weight estimation unit
5 Speed limit setting unit
6 Driving control unit
C Container
N Loading platform
S Driving control system

The invention claimed is:
1. A weight estimation system comprising:
at least one memory storing instructions;
at least one processor configured to execute the instructions; and
a plurality of distance sensors mounted on a vehicle which measure a distance of a loading platform of the vehicle from a ground as a height of the loading platform;
wherein
the at least one processor is further configured to:
acquire a height of the loading platform before loading the vehicle and a height of the loading platform after loading the vehicle from each of the plurality of distance sensors;
calculate an amount of change between the heights of the loading platform before and after the loading on each of the plurality of distance sensors:
calculate an average value of a plurality of the amounts of change;
estimate a loaded weight on the basis of the average value and mapping data of a correlation between an amount of change and a loaded weight stored in advance;
estimate a center of gravity position on the basis of the plurality of the amounts of change and mapping data of a correlation between an amount of change and a center of gravity position stored in advance; and
set a speed limit of the vehicle on the basis of the center of gravity position.

* * * * *